(12) United States Patent
Aksu et al.

(10) Patent No.: US 11,442,985 B2
(45) Date of Patent: Sep. 13, 2022

(54) APPARATUS AND A METHOD FOR ARTIFICIAL INTELLIGENCE

(71) Applicant: Nokia Technologies Oy, Espoo (FI)

(72) Inventors: Emre Aksu, Tampere (FI); Miska Hannuksela, Tampere (FI); Jonne Juhani Mäkinen, Tampere (FI); Juha-Pekka Hippeläinen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/274,361

(22) PCT Filed: Sep. 13, 2019

(86) PCT No.: PCT/FI2019/050658
§ 371 (c)(1),
(2) Date: Mar. 8, 2021

(87) PCT Pub. No.: WO2020/058570
PCT Pub. Date: Mar. 26, 2020

(65) Prior Publication Data
US 2021/0349943 A1 Nov. 11, 2021

(30) Foreign Application Priority Data

Sep. 20, 2018 (FI) ...................................... 20185781

(51) Int. Cl.
*G06F 16/30* (2019.01)
*G06F 16/783* (2019.01)
(Continued)

(52) U.S. Cl.
CPC ............ *G06F 16/783* (2019.01); *G06F 16/14* (2019.01); *G06F 16/164* (2019.01); *G06F 16/74* (2019.01); *G06F 16/75* (2019.01); *G06N 3/02* (2013.01)

(58) Field of Classification Search
CPC ...... G06F 16/783; G06F 16/164; G06F 16/74; G06F 16/14; G06F 16/75; G06N 3/02
See application file for complete search history.

(56) References Cited

U.S. PATENT DOCUMENTS 9,897,450 B2 * 2/2018 Aksu ..................... G01C 21/165
2010/0124378 A1 5/2010 Das et al.
(Continued)

FOREIGN PATENT DOCUMENTS

| JP | 2008-060622 A | 3/2008 |
| JP | 2012-509522 A | 4/2012 |

(Continued)

OTHER PUBLICATIONS

"Information technology—High Efficieny Coding and Media Delivery in Heterogeneous Environments—Part 12:Image File Format", ISO/IEC 23008-12, First Edition, Dec. 2017, 82 pages.

(Continued)

*Primary Examiner* — Mahesh H Dwivedi
(74) *Attorney, Agent, or Firm* — Nokia Technologies Oy (57) ABSTRACT

The embodiments relate to a method comprising receiving visual data in a file format compatible with ISO base media file format; processing the visual data to detect one or more content elements; storing the detected one or more content elements and information on the used process as a metadata; and including the metadata to the media file in association with the visual data. The embodiments also relate to a technical equipment for implementing the method.

20 Claims, 6 Drawing Sheets

(51) Int. Cl.
　　　*G06F 16/16*　　(2019.01)
　　　*G06F 16/74*　　(2019.01)
　　　*G06F 16/14*　　(2019.01)
　　　*G06F 16/75*　　(2019.01)
　　　*G06N 3/02*　　(2006.01)

(56) References Cited

U.S. PATENT DOCUMENTS

| | | | |
|---|---|---|---|
| 2014/0178043 A1 | 6/2014 | Kritt et al. | |
| 2016/0234144 A1 | 8/2016 | Hannuksela et al. | |
| 2016/0371265 A1* | 12/2016 | Aksu | G06F 40/205 |
| 2018/0143756 A1 | 5/2018 | Mildrew et al. | |
| 2018/0160156 A1* | 6/2018 | Hannuksela | H04N 21/236 |
| 2018/0167686 A1 | 6/2018 | James et al. | |
| 2019/0356893 A1* | 11/2019 | Tanabe | H04N 5/77 |

FOREIGN PATENT DOCUMENTS

| | | |
|---|---|---|
| JP | 2018-510595 A | 4/2018 |
| WO | 2015/093330 A1 | 6/2015 |
| WO | 2016/202664 A1 | 12/2016 |

OTHER PUBLICATIONS

"Amazon Rekognition", aws, Retrieved on Mar. 4, 2021, Webpage available at : https://aws.amazon.com/rekognition/.
"Computer Vision", Microsoft Azure, Retrieved on Mar. 4, 2021, Webpage available at : https://azure.microsoft.com/en-us/services/cognitive-services/computer-vision/.
"Cloud Vision API", Google Cloud, Retrieved on Mar. 4, 2021, Webpage available at : https://cloud.google.com/vision/.
"Mobile Vision", Google Developers, Retrieved on Mar. 4, 2021, Webpage available at : https://developers.google.com/vision/.
"Information Technology—Coding of Audio-Visual Objects—Part 12: ISO Base Media File Format", ISO/IEC 14496-12, Fifth edition, Dec. 15, 2015, 248 pages.
"Information Technology—Coding of Audio-Visual Objects—Part 14: MP4 File Format", ISO/IEC 14496-14, First edition, Nov. 15, 2003, 18 pages.
"Information Technology—Coding of Audio-Visual Objects—Part 15: Advanced Video Coding (AVC) File Format", ISO/IEC 14496-15, First edition, Apr. 15, 2004, 29 pages.
"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.
Office action received for corresponding Finnish Patent Application No. 20185781, dated Apr. 15, 2019, 8 pages.
Duan et al., "Compact Descriptors for Video Analysis: theEmerging MPEG Standard", arXiv, Apr. 26, 2017, pp. 1-8.
Maze et al., "Signaling of Logically Grouped Image Shots in HEIF", ISO/IEC JTC1/SC29/WG11 MPEG2018/m42564, Canon Research Centre France, Apr. 2018, 7 pages.
International Search Report and Written Opinion received for corresponding Patent Cooperation Treaty Application No. PCT/FI2019/050658, dated Dec. 12, 2019, 14 pages.
Heikkila, "High Efficiency Image File Format Implementation", Thesis, May 4, 2016, 61 pages.
Hannuksela, "Technology Under Consideration on ISO/IEC 23008-12", ISO/IEC JTC1/SC29/WG11 MPEG2018/N17825, Systems, Jul. 2018, 8 pages.
Vadakital et al., "Derived Visual Tracks for ISOBMFF and HEIF", ISO/IEC JTC1/SC29/WG11, MPEG2016/M37869, Nokia Technologies, Feb. 2016, 5 pages.
Extended European Search Report received for corresponding European Patent Application No. 19862049.4, dated May 23, 2022, 11 pages.
Sullivan et al., "DIS for Multi-Image Application Format (MIAF)", Editors, ISO/IEC/JTC1/SC29/WG11/w17550, Jul. 2020, 39 pages.
Denoual et al., "Examples of use of the Image File Format", Canon Research Centre France, ISO/IEC JTC1/SC29/WG11 MPEG2015/M37250, Oct. 2015, 20 pages.
Park et al., "Use cases and draft requirement for NBMP (v2)", Requirements, ISO/IEC JTC1/SC29/WG11 MPEG2017/N 17262, Oct. 2017, 19 pages.
Office action received for corresponding Japanese Patent Application No. 2021-514414, dated Jun. 29, 2022, 4 pages of office action and 4 pages of translation available.

* cited by examiner

APPARATUS AND A METHOD FOR ARTIFICIAL INTELLIGENCE

RELATED APPLICATION

This application claims priority to PCT Application No. PCT/FI2019/050658, filed on Sep. 13, 2019, which claims priority to Finnish Application No. 20185781, filed on Sep. 20, 2018, each of which is incorporated herein by reference in its entirety.

TECHNICAL FIELD

The present solution generally relates to artificial intelligence (AI). In particular, the solution relates to an apparatus and a method for storing and signaling artificial intelligence metadata.

BACKGROUND

Many practical applications rely on the availability of semantic information about the content of the media, such as images, videos, etc. Semantic information is represented by metadata which may express the type of scene, the occurrence of a specific action/activity, the presence of a specific object, etc. Such semantic information can be obtained by analyzing the media.

Recently, the development of various neural network techniques has enabled learning to recognize various elements of image/video content directly from the raw image data. When discussing on computers ability to recognize e.g. visual or auditory elements from a respective content, term "Artificial Intelligence" (AI) comes up, which is a generic term including neural networks and machine learning.

SUMMARY

Now there has been invented an improved method and technical equipment implementing the method, by which the above problems are alleviated. Various aspects include a method, an apparatus and a computer readable medium comprising a computer program stored therein, which are characterized by what is stated in the independent claims. Various embodiments are disclosed in the dependent claims.

According to a first aspect, there is provided a method comprising receiving visual data in a container file format; processing the visual data to detect one or more content elements; storing the detected one or more content elements and information on used process for detecting said one or more content elements as a metadata; and including the metadata to the container file in association with the visual data.

According to a second aspect, there is provided an apparatus comprising means for receiving visual data in a container file format; means for processing the visual data to detect one or more content elements; means for storing the detected one or more content elements and information on the used process for detecting said one or more content elements as a metadata; and means for including the metadata to the container file in association with the visual data.

According to a third aspect, there is provided an apparatus comprising at least one processor and memory including computer program code, wherein said computer program code comprises instructions that when executed by the processor, cause the apparatus to receive visual data in a container file format; process the visual data to detect one or more content elements; store the detected one or more content elements and information on the used process for detecting said one or more content elements as a metadata; and include the metadata to the container file in association with the visual data.

According to a fourth aspect, there is provided a computer program product comprising computer program code configured to, when executed on at least one processor, cause an apparatus or a system to receive visual data in a container file format; process the visual data to detect one or more content elements; store the detected one or more content elements and information on used process for detecting said one or more content elements as a metadata; and include the metadata to the container file in association with the visual data.

According to an embodiment, the container file comprises a first box comprising metadata on a processing algorithm.

According to an embodiment, the container file comprises a second box comprising metadata on said one or more content elements.

According to an embodiment, the container file comprises a third box comprising metadata on a process of multiple processing algorithms.

According to an embodiment, the container file is an image sequence or a video, wherein the container file comprises a media sample definition for media tracks containing the metadata.

According to an embodiment, the container file comprises relationship definitions for relating a container to other entities carrying information in the container file.

According to an embodiment, the visual data is processed by one or more neural networks; or one or more non-neural network based algorithms to detect said one or more content elements.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

In the following, several embodiments will be described in the context of artificial intelligence. In particular, the several embodiments enable storage and signaling of artificial intelligence metadata in a media file.

Figure 1:
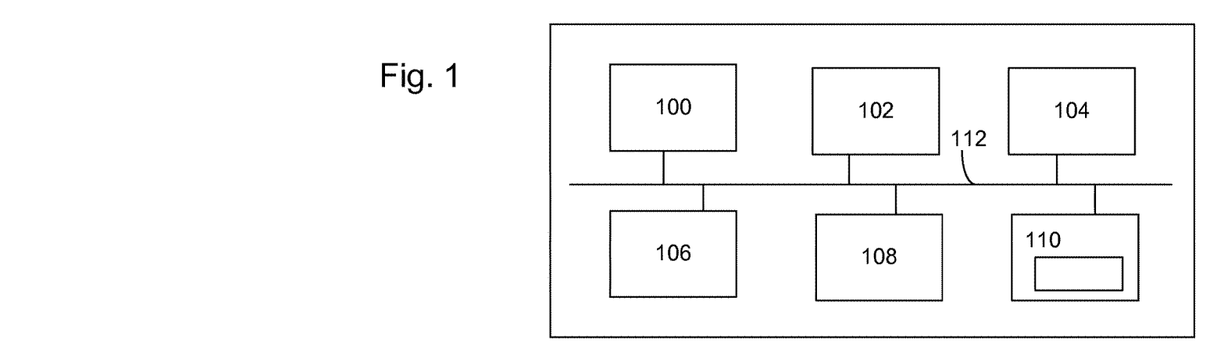
FIG. 1 shows an apparatus according to an embodiment.

FIG. 1 shows a computer system suitable to be used in data processing according to an embodiment. The generalized structure of the computer system will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100. Computer program code resides in the memory 102 for implementing, for example, machine learning process. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

It needs to be understood that different embodiments allow different parts to be carried out in different elements. For example, various processes of the computer system may be carried out in one or more processing devices; for example, entirely in one computer device, or in one server device or across multiple user devices. The elements of machine learning process may be implemented as a software component residing on one device or distributed across several devices, as mentioned above, for example so that the devices form a so-called cloud.

The syntax of many media file formats is based on a hierarchical list of type and length prefixed data chunks or boxes, where the naming depends on the format in question. In a container file according to ISO base media file format (ISOBMFF; ISO/IEC 14496-12), the media data and metadata is arranged in various types of boxes. Many formats are derived from ISOBMFF, including the High Efficiency Image File Format (HEIF, ISO/IEC 23008-12), MPEG-4 file format (ISO/IEC 14496-14, also known as the MP4 format), file format for NAL unit structured video (ISO/IEC 14496-15) and 3GPP file format (3GPP TS 26.244, also known as the 3GP format). These formats use the same box-structured basic structure.

Some concepts, structures, and specifications of ISO base media file format (ISO/IEC 14496-12, which may be abbreviated ISOBMFF) are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
``` track_IDs may be specified as an array of integers providing the track identifiers of the referenced tracks or track_group_id values of the referenced track groups. Each value of track_IDs[i], where i is a valid index to the track_IDs[ ] array, is an integer that provides a reference from the containing track to the track with track_ID equal to track_IDs[i] or to the track group with both track_group_id equal to track_IDs[i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

A draft amendment to the ISO Base Media File Format standard explains compact sample-to group mapping as follows:

Box Type: 'csgp'

Container: SampleTableBox or TrackFragmentBox

Mandatory: No

Quantity: Zero or more.

The compact sample to group box provides a more compact way to represent the mapping from sample to group, especially in the cases where there are repeating patterns, and when there are few sample groups of a particular type.

The design uses a vector of concatenated patterns each of which is used once by a mapping array, which associates runs of samples with repeats of that pattern. This is illustrated by the following example. In the following, each letter represents a different sample group description index value (possibly 0).

If a track has the following associations, starting from the first sample:

a b c b a b c b a b c x x a b c b a b d b those associations might be represented by the following:

```
1.          pattern_length=4; sample_count=11;
2.          pattern_length=1; sample_count=2;
3.          pattern_length=4; sample_count=6;
4.          pattern_length=2; sample_count=2;
pattern=[
            a b c b         // pattern 1 of length 4
            x               // pattern 2 of length 1
            a b c b         // pattern 3 of length 4
            d b             // pattern 4 of length 2
]                           // the pattern_length is thus 4+1+4+2=11
```

When sample_count[i] is equal to pattern_length[i], the pattern is not repeated.

When sample_count[i] is greater than pattern_length[i], the sample_group_description_index values of the i-th pattern are used repeatedly to map the sample_count[i] values. It is not necessarily the case that sample_count[i] is a multiple of pattern_length[i]; the cycling may terminate in the middle of the pattern.

When the total of the sample_count[i] values for all values of i in the range of 1 to pattern_count, inclusive, is less than the total sample count, the reader should associate the samples that have no explicit group association with the default group defined in the SampleDescriptionGroupBox, if any, or else with no group.

It is an error for the total of the sample_count[i] values to be greater than the total count of actual samples described by the encompassing TrackBox or TrackFragmentBox, and the reader behaviour would then be undefined.

Syntax:

```
aligned(8) class CompactSampleToGroupBox
    extends FullBox('csgp', version, 0)
{
    unsigned int(32) grouping_type; unsigned int(1)
    index_msb_indicates_fragment_local_description;
    unsigned int(1) grouping_type_parameter_present;
    unsigned int(6) field_size_minus_1;
    if (grouping_type_parameter_present == 1) {
        unsigned int(32) grouping_type_parameter;
    }
    unsigned int(32) pattern_count;
    totalPatternLength = 0;
    for (i=1; i <= pattern_count; i++) {
        unsigned int(32) pattern_length[i];
        unsigned int(32) sample_count[i];
        totalPatternLength += pattern_length[i];
    }
    for (j=1; j <= pattern_count; j++) {
        for (k=1; k <= pattern_length[j]; k++) {
            unsigned int(field_size)
    sample_group_description_index[j][k];
                // whose msb might indicate fragment_local or
    global
        }
    }
}
```

Semantics:
version is an integer that specifies the version of this box, currently 0.
grouping_type is an integer that identifies the type (i.e. criterion used to form the sample groups) of the sample grouping and links it to its sample group description table with the same value for grouping type. At most one occurrence of either the 'csgp' or 'sbgp' with the same value for grouping_type (and, if used, grouping_type_parameter) shall exist for a track.
grouping_type_parameter is an indication of the sub-type of the grouping.
index_msb_indicates_fragment_local_description is a flag that must be zero when this box appears inside a 'trak' box but may be 0 or 1 when this box appears inside a 'traf' box. When it is 1, it indicates that the most significant bit (MSB) of every sample_group_description_index does not form part of the index number but instead indicates which 'sgpd' box the group description is to be found in: if the MSB is 0, the index identifies a group description from the 'trak' box's 'sgpd' box; if the MSB is 1, the index identifies a group description from the 'traf' box's 'sgpd' box.
field_size is an integer specifying the size in bits of the entries in the array of sample_group_description_index values; it shall take the value 3, 7, 15 or 31, indicating field sizes of 4, 8, 16, 32 respectively. If the field size 4 is used, then each byte contains two values: entry[i]«4+entry [i+1]; if the sizes do not fill an integral number of bytes, the last byte is padded with zeros.
pattern_count indicates the length of the associated pattern in the pattern array that follows it. The sum of the included sample_count values indicates the number of mapped samples.
pattern_length[i] corresponds to a pattern within the second array of sample_group_description_index[j] values. Each instance of pattern_length[i] shall be greater than 0.
sample_count[i] specifies the number of samples that use the i-th pattern. sample_count[i] shall be greater than zero, and sample_count[i] shall be greater than or equal to pattern_length[i].

sample_group_description_index [j][k] is an integer that gives the index of the sample group entry which describes the samples in this group. The index ranges from 1 to the number of sample group entries in the SampleGroupDescriptionBox, inclusive, or takes the value 0 to indicate that this sample is a member of no group of this type.

In the description and embodiments, a compact sample-to-group box or alike may be used equivalently when a sample-to-group box or SampleToGroupBox is referred.

A sub-sample may be defined as a contiguous range of bytes of a sample. Information on sub-samples may be given in SubSampleInformationBox(es) that may be contained in the SampleTableBox and/or TrackFragmentBox(es). Specific definition of a sub-sample may be for a given coding system and/or for a given encapsulation format of a coding system (e.g. particular sample entry type) and/or may be further specified using the flags field of the containing SubSampleInformationBox. For example, values of the flags field for HEVC can indicate a sub-sample addressed by the SubSampleInformationBox is a NAL unit, a decoding unit, a tile, a coding tree unit row, a slice, or a coded picture. When more than one SubSampleInformationBox is present in the same container box, the value of flags may be required to differ in each of these SubSampleInformationBoxes.

The syntax of SubSampleInformationBox may be specified as follows:

```
aligned(8) class SubSampleInformationBox
    extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if (version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) codec_specific_parameters;
            }
        }
    }
}
```

The semantics of syntax elements of SubSampleInformationBox may be specified as follows: version is an integer that specifies the version of this box. entry_count is an integer that gives the number of entries in the following table. sample_delta is an integer that indicates the sample having sub-sample structure. It is coded as the difference, in decoding order, between the desired sample number, and the sample number indicated in the previous entry. If the current entry is the first entry in the track, the value indicates the sample number of the first sample having sub-sample information, that is, the value is the difference between the sample number and zero (0). If the current entry is the first entry in a track fragment with preceding non-empty track fragments, the value indicates the difference between the sample number of the first sample having sub-sample information and the sample number of the last sample in the previous track fragment. If the current entry is the first entry in a track fragment without any preceding track fragments, the value indicates the sample number of the first sample having sub-sample information, that is, the value is the difference between the sample number and zero (0). This implies that the sample_delta for the first entry describing the first sample in the track or in the track fragment is always 1. subsample_count is an integer that specifies the number of sub-sample for the current sample. If there is no sub-sample structure, then this field takes the value 0. subsample_size is an integer that specifies the size, in bytes, of the current sub-sample. subsample_priority is an integer specifying the degradation priority for each sub-sample. Higher values of subsample_priority, indicate sub-samples which are important to, and have a greater impact on, the decoded quality. discardable equal to 0 means that the sub-sample is required to decode the current sample, while equal to 1 means the sub-sample is not required to decode the current sample but may be used for enhancements, e.g., the sub-sample consists of supplemental enhancement information (SEI) messages. codec_specific_parameters is defined by the codec and/or its encapsulation format (e.g. sample entry type) in use. If no such definition is available, this field is set to 0.

The High Efficiency Image File Format (HEIF) is a standard developed by the Moving Picture Experts Group (MPEG) for storage of images and image sequences (such as video). HEIF includes a rich set of features building on top of the widely used ISO Base Media File Format (ISOBMFF), making HEIF feature-wise superior compared to other image file formats. In the present disclosure, terms "HEIF", "ISOBMFF" and "file format" can be used interchangeably.

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items. Any number of image items can be included in the same file. Given a collection images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: ItemPropertyContainerBox that contains an implicitly indexed list of item properties, and one or more ItemPropertyAssociationBox(es) that associate items with item properties. Item property is formatted as a box.

A descriptive item property may be defined as an item property that describes rather than transforms the associated item. A transformative item property may be defined as an item property that transforms the reconstructed representation of the image item content.

A neural network (NN) is a computation graph consisting of several layers of computation. Each layer consists of one or more units, where each unit performs an elementary computation. A unit is connected to one or more other units, and the connection may have associated a weight. The weight may be used for scaling the signal passing through the associated connection. Weights are usually learnable parameters, i.e., values which can be learned from training data. Two of the most widely used architectures for neural networks are feed-forward and recurrent architectures. Feed-forward neural networks are such that there is no feedback loop: each layer takes input from one or more of the layers before and provides its output as the input for one or more of the subsequent layers. Also, units inside certain layers take input from units in one or more of preceding layers and provide output to one or more of following layers. Initial layers (those close to the input data) extract semantically low-level features such as edges and textures in images, and intermediate and final layers extract more high-level features. After the feature extraction layers there may be one or more layers performing a certain task, such as classification, semantic segmentation, object detection, denoising, style transfer, super-resolution, etc. In recurrent neural nets, there is a feedback loop, so that the network becomes stateful, i.e., it is able to memorize information or a state.

Neural networks are being utilized in an ever-increasing number of applications for many different types of device, such as mobile phones. Examples include image and video analysis and processing, social media data analysis, device usage data analysis, etc.

Figure 2:
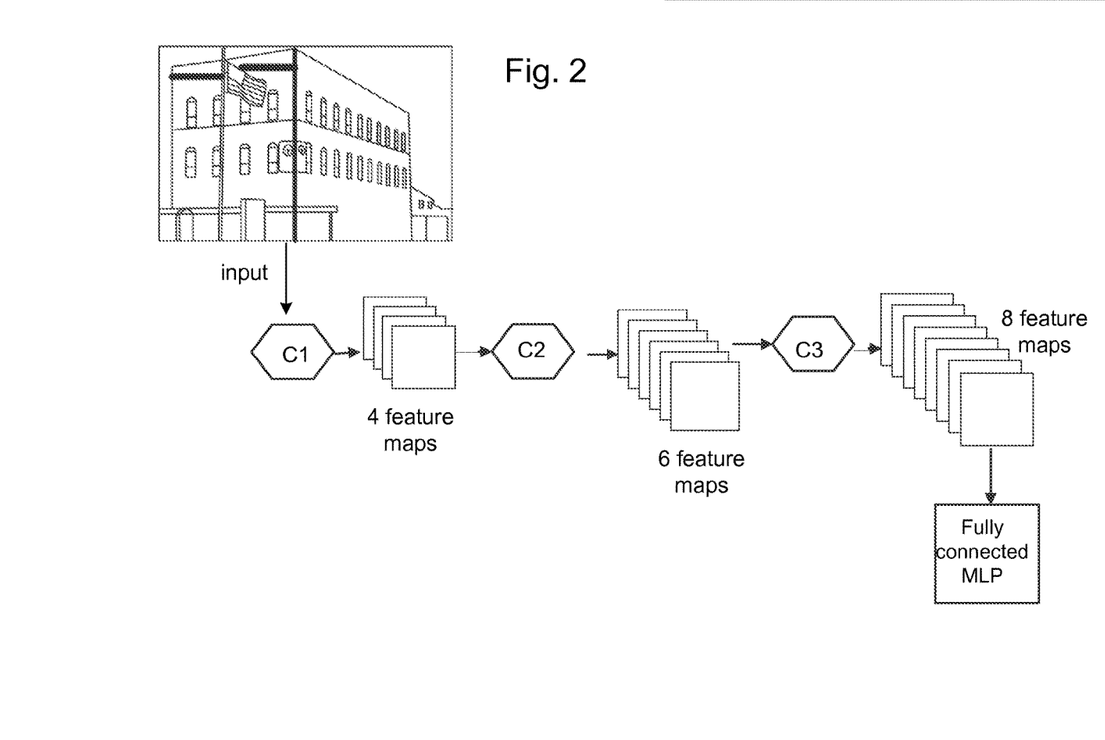
FIG. 2 shows an example of a convolutional neural network.

An example of a feature extractor in deep learning techniques is included in the Convolutional Neural Network (CNN), shown in FIG. 2. A CNN is composed of one or more convolutional layers, fully connected layers, and a classification layer on top. CNNs are easier to train than other deep neural networks and have fewer parameters to be estimated. Therefore, CNNs are highly attractive architecture to use, especially in image and speech applications.

In the example of FIG. 2, the input to a CNN is an image, but any other data could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 2 has only three feature (or abstraction, or semantic) layers C1, C2, C3 for the sake of simplicity, but CNNs may have more than three, and even over convolution layers.

The first convolution layer C1 of the CNN may comprise extracting 4 feature-maps from the first layer (i.e. from the input image). These maps may represent low-level features found in the input image, such as edges and corners. The second convolution layer C2 of the CNN, consisting of extracting 6 feature-maps from the previous layer, increases the semantic level of extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully-connected (i.e., dense) layers and a final classification layer. The MLP uses the feature-maps from the last convolution layer in order to predict (recognize) for example the object class. For example, it may predict that the object in the image is a house.

The goal of a neural network is to transform the input data into a more useful output. One example is classification, where input data is classified into one of N possible classes (e.g., classifying if an image contains a cat or a dog). Another example is regression, where input data is transformed into a Real number (e.g. determining the music beat of a song).

In the present description, terms "model" and "neural network" are used interchangeably. In addition, "the weights of neural networks" are sometimes referred to as "learnable parameters" or "parameters".

Artificial Intelligence (AI) is a generic term which includes neural networks and machine learning. Currently there are cloud-based AI services which provide machine learning based services for different market segments such as computer vision, imaging, big data and/or visual analytics. In addition, there are already some smart phones containing neural processing units in the market, but it is appreciated that the number will increase greatly within the following years.

One of the most important applications of neural network is in image/video analysis and manipulation. Images and/or image sequences are processed with different machine learning based algorithms on the mobile phones either real-time or in batch mode. Most of the time, such processing generates extra metadata which is stored as a different file than the original image file. One reason for this is the limitation of the current image formats such as JPEG (Joint Photographic Experts Group), PNG (Portable Network Graphics), TIFF (Tagged Image File Format), etc. and lack of a standard mechanism to store such algorithm's results in media files. HEIF provides the necessary extendibility to include such information in a structured way so that the metadata does not live outside the file but becomes part of the image/video consumption in a processing chain.

AI based media processing pipelines either manipulate the media data and "bake in" the result (e.g. by changing the exposure of the image and re-writing the pixel values) or they generate additional metadata files which represent the inferred result of the AI algorithm (e.g. the bounding boxes of the faces detected as a result of the face detection algorithm). Moreover, there can be certain dependencies between the AI algorithms. One example can be that the system first detects the faces and then apply a person recognition algorithm on the bounding boxes of the detected faces in order to give a unique name or ID to them. Such cascading operation requires proprietary interfaces and APIs (Application Programming interface) which are currently not interoperable especially when multiple systems from multiple vendors need to operate together.

Moreover, there is no mechanism to store and signal such AI metadata that relates to the media data. MPEG's current ISO based media file format and derivatives such as the high efficiency image file format (HEIF) or other formats compatible with ISO base media file format does not have any standardized mechanism for:
1. storage of AI and machine learning algorithm inference results for images, image sequences or video;
2. storage of information about the cascaded processes which has to run one after another in order to perform a specific operation (e.g. detect faces and then recognize faces as a separate process and store their related metadata);
3. storage of information about the algorithm utilized so that any other entity can re-run the algorithm (or a new version of the algorithm) and then update the related metadata in the media file;
4. storage of information about the format of the data which is stored as the result of the applied AI based algorithm so that the data can be parsed properly by other parties which will utilize the results.

Lack of the above-mentioned storage and signaling mechanisms may limit the usage and interoperability of AI based media manipulation services and algorithms. Lack of a standard and well-defined mechanism to store, exchange, manipulate and feed-forward such AI based algorithms may result in one of the problems of the current industry and leads way to isolated and closed ecosystems and proprietary format definitions.

Known cloud-based services, which have REST API (Representational State Transfer Application Programming Interface) based visual AI based image and video processing services, are not integrated and they are isolated to single operations rather than cascading and feed-forward type of multi-algorithm operations.

The purpose of the present embodiments is to define a storage and signaling mechanism for ISO based media file formats (especially for HEIF) and other media file formats which can be utilized to have such storage and interoperability capability for visual AI metadata. By providing such a mechanism, the invention enables storage, signaling, non-destructive editing and cascading of algorithms in an interoperable and standard way.

The present embodiments are applicable e.g. in the following Visual AI Metadata and processes:
  Object detection
  Face detection and recognition
  Person sentiment
  Gender and age prediction
  Face landmark analysis
  Face pose detection
  Optical Character Recognition (OCR) (extract text and save in HEIF)
  Inappropriate content analysis (auto-content-filter)
  Context detection
  Context based object and semantic parsing (e.g. wedding, dinner, birthday, party, sports, etc.)
  Action recognition
  Logo and product detection
  General image attributes (color, light, ambiance, etc.)
  Scene semantic parsing
  Image captioning
  Segmentation and alpha masks
  Depth maps
  Non-destructive image manipulation (e.g. style transfers, alpha masking and image blending, "lenses", filters, . . . )

As said, the present embodiments enable storage and signaling of AI metadata in ISOBMFF compliant file formats in a standard and efficient way. To achieve that, the following file format boxes (i.e. computer-readable object-oriented building blocks) and relationships are defined in order to store and signal AI related metadata in an ISO Base Media File Format compliant approach:
1. A new property box which contains descriptive metadata about the AI based algorithm;
2. A new box which stores the AI based algorithm metadata output. This box may have a generic payload definition; hence it is compliant with any AI algorithm output. Additional service and scheme information provides semantic and syntax information of the algorithm output.

3. A new box which contains information about the AI processes which is comprised of multiple algorithms running in a defined data flow.
4. A new media sample definition for timed metadata tracks which contains the AI based algorithm output metadata in a temporally changing manner.
5. Relationship definitions in order to relate the above-mentioned new boxes to other information bearing entities in the ISO based media file format.

For the present embodiments, a data carriage mechanism can be decoupled from the data syntax. At the same time, the pointers to the AI services which are utilized to generate the AI specific data may be indicated. In order to achieve these, the AI properties may contain the following syntax elements:

1. A service definition indicator
2. A service version which indicates which version of the service is utilized to generate the AI data
3. A service description which provides further details about the AI service
4. A service schema location which provides the syntax definition for parsing the stored AI data. This schema provides the necessary flexibility to have a generic container for AI data.
5. A generic data structure to carry the AI data.
6. A generic mechanism to relate the input/output dependency between different AI processes. For example, a face recognition AI process depends on first a face detector in order to provide the bounding boxes for the faces in the image.
7. A generic mechanism to store or point to the utilized neural network model.

The present embodiments define new item properties or new boxes for the syntax elements presented above according to the following way:

Item 5:

Item 5 relates to a generic data structure to carry the AI data. This can be implemented by defining a new box called VAIDataBox. This box can be stored in the ItemProperty-ContainerBox or any other location in the meta box or media box.

The syntax definition of VAIDataBox is as follows:

```
aligned(8) class VAIDataBox
    extends FullBox('vaid', version = 0, flags = 0) {
    unsigned int(8)vai_data[ ];
}
``` vai_data is opaque data whose form is defined by schema listed in schema_location, if present, or by service.

As an alternative to using VaiDataBox is to include the vai_data[ ] array directly in the containing structure (e.g., vai_data[ ] can be included directly in the VAIIProperty in the embodiment below).

Items 1, 2, 3 and 4:

Items 1, 2, 3, and 4 relate to a service definition indicator, a service version, a service description and a service schema location. For these, a new item property can be defined. Such a definition can be as follows:

```
aligned(8) class VAIIProperty
    extends ItemFullProperty('vaii', version = 0, flags = 0)
{
    string service;
    string service_version;// optional
    string service_description;// optional
    string schema_location;// optional
    VAIDataBox( );
}
``` service may be a URL or URN entry as a null-terminated string using e.g. UTF-8 characters used to identify service that generated vai_data of the VAIDataBox.

service_version is the version of service defined by a null-terminated string using UTF-8 characters. It also can be an empty null-terminated string.

service_description is a null-terminated string containing human readable description of service, which has generated the VAIDataBox. It may be an empty null-terminated string.

schema_location is a null-terminated string consisting of a space-separated list, in UTF-8 characters, of zero or more URL's for schema(s) to which the VAIDataBox data conforms to. It may be empty null-terminated string.

It needs to be understood that the data types used above are examples and embodiments can be similarly realized with other data types. For example, instead of using a URI to identify the service, a UUID or a registered type value (e.g. a four-character code) can be used as an identifier. In another example, service_version can be specified as an unsigned integer value or a sequence of unsigned integer value s(e.g., a major version and a minor version).

It needs to be understood that embodiments apply for but are not limited to any set of one or more elements described above (service, service_version, service_description, schema_location, VAIDataBox) or alike.

Item 6:

Item 6 relates to a generic mechanism to relate the input/output dependency between different AI processes. For this, a new box called ItemPropertyRelationBox may be defined in order to store the input/output relationship of properties. This box may be inside the ItemPropertiesBox ('iprp') or any other box in the meta box.

The syntax definition for ItemPropertyRelationBox is as follows:

```
aligned(8) class ItemPropertyRelationBox
    extends FullBox('iprl', version = 0, flags = 0) {
    unsigned int (8) input_count;
    for (i=0; i<input_count; i++) {
        unsigned int(16) property_index;
    }
    unsigned int (8) output_count;
    for (i=0; i< output_count; i++) {
        unsigned int(16) property_index;
    }
}
``` input_count is number (1 to n) of input properties that this process ingested.

output_count is number (1 to n) of output properties that this process produced property_index is 1-based index of the property in the ItemPropertyContainerBox contained in the same ItemPropertiesBox used by either input or output of this process.

In an embodiment, the box ItemPropertyRelationBox may reside inside a new version of ItemPropertyAssociation as follows:

```
aligned(8) class ItemPropertyAssociationBox
    extends FullBox('ipma', version, flags)
{
    unsigned int(32) entry_count;
    for(i =0; i < entry_count; i++) {
        if (version < 1)
            unsigned int(16)            item_ID;
        else
            unsigned int(32)            item_ID;
        unsigned int(8) association_count;
        for (i=0; i<association_count; i++) {
            bit(1) essential;
            if (flags & 1)
                unsigned int(15) property_index;
            else
                unsigned int(7) property_index;
        }
        If (flags & 2)
            ItemPropertyRelationBox relation;
    }
}
``` relation defines the property input/output relationship for the listed item_ID.

In another embodiment, the item property relations may be appended at the end of ItemPropertyAssociationBox, e.g. as follows. This embodiment may be more compatible with legacy parsers.

```
aligned(8) class ItemPropertyAssociationBox
    extends FullBox('ipma', version, flags)
{
    unsigned int(32) entry_count;
    for(i = 0; i < entry_count; i++) {
        if (version < 1)
            unsigned int(16)            item_ID;
        else
            unsigned int(32)            item_ID;
        unsigned int(8) association_count;
        for (i=0; i<association_count; i++) {
            bit(1) essential;
            if (flags & 1)
                unsigned int(15) property_index;
            else
                unsigned int(7) property_index;
        }
    }
    if (flags & 2) {
        unsigned int[16] relation_count;
        ItemPropertyRelationBox
            relation[relation_count];
    }
}
```

According to an embodiment, ItemPropertyRelationBox can alternatively be a data structure (i.e. without a box header).

Figure 3:
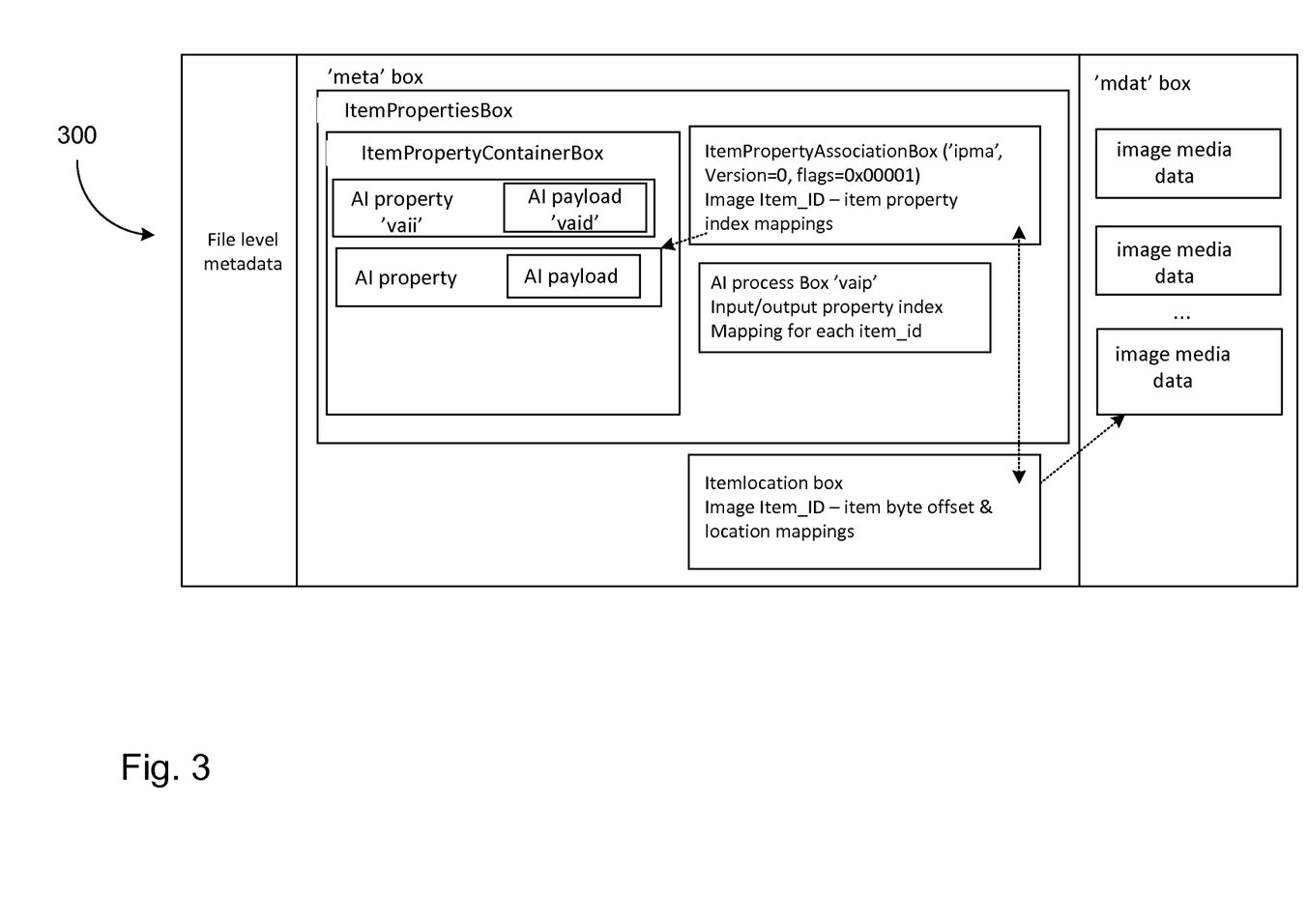
FIG. 3 shows a first embodiment for AI property storage in HEIF.

The AI payload data may be stored in the meta box or inside the media data (mdat) box.
1. AI payload data is stored and signaled in tight coupling with the AI properties, as shown in FIG. 3, or
2. AI payload data is stored and signaled as an item, as shown in FIG. 4.

When the AI payload is stored and signaled in tight coupling with the AI properties, VAIIProperty box may contain the VAIDataBox. In this example, the AI property contains the related AI payload data. FIG. 3 illustrates a HEIF media file 300 with such storage mechanism. The media file 300 comprises 'mdat' box for carrying the media data, i.e. image media data. In addition, the media file 300 comprises 'meta' box for carrying all relevant AI metadata and AI payload data. Hence, modification of the metadata may have a minimal effect on the media data offsets, which maybe desirable in re-editing use-cases.

When the AI payload is stored and signaled as an item, the AI payload may be stored as an item in the meta or the media data box. In this example, the AI property contains the metadata (e.g. the URI for the service that was used to generate the AI payload) but no the AI payload. FIG. 4 illustrates how such storage would look like in a HEIF file 400.

Figure 4:
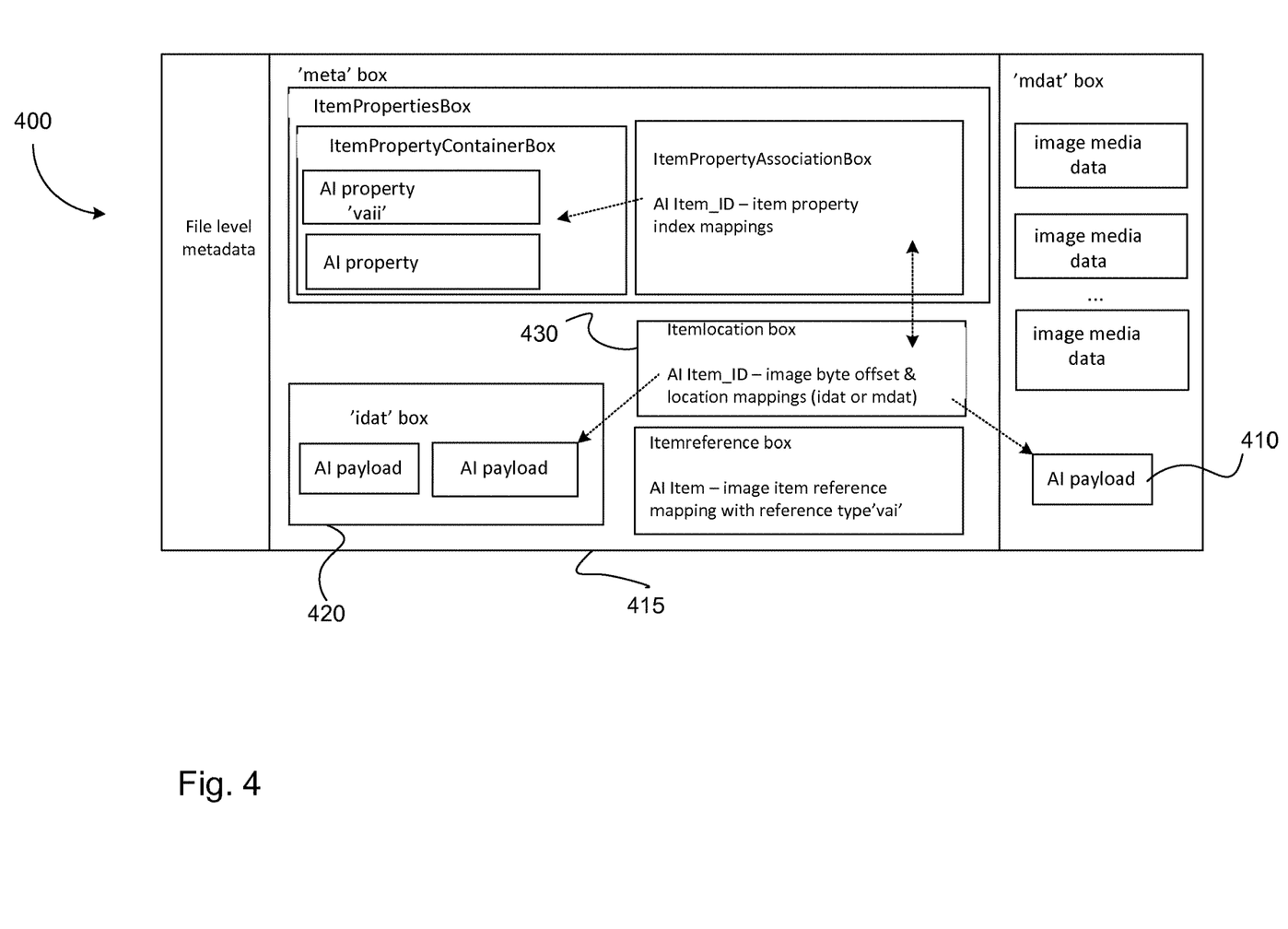
FIG. 4 shows a second embodiment for AI property storage in HEIF.

As can be seen in FIG. 4, AI payload 410 may be stored in the 'mdat' box as an opaque data which is represented by an 'item' in the 'meta' box. As an embodiment, the same representation may be done by using the 'idat' box 420 inside the 'meta' box 415, and storage of AI payload as opaque data can be achieved inside the 'meta' box 415. In such a case, the construction_method of the AI item as indicated in the item location box ('iloc') 430 shall be set to 1, which corresponds to idat_offset. This may be desirable in cases where the 'mdat' manipulation is cumbersome or not desired.

In this option, the AI process which was previously represented by the ItemPropertyRelationBox may be replaced by an item referencing mechanism (by utilizing 'iref' box) with a specific item reference type, which can be 'vai'. The ItemReference Box is defined as follows in HEIF specification (ISO/IEC 23008-12).

```
aligned(8) class SingleItemTypeReferenceBox(referenceType)
    extends Box(referenceType) {
    unsigned int(16) from_item_ID;
    unsigned int(16) reference_count;
    for (j=0; j<reference_count; j++) {
        unsigned int(16) to_item_ID;
    }
}
aligned(8) class
SingleItemTypeReferenceBoxLarge(referenceType) extends
Box(referenceType) {
    unsigned int(32) from_item_ID;
    unsigned int(16) reference_count;
    for (j=0; j<reference_count; j++) {
        unsigned int(32) to_item_ID;
    }
}
aligned(8) class ItemReferenceBox extends FullBox('iref',
version, 0) {
    if (version==0) {
        SingleItemTypeReferenceBox       references[ ];
    } else if (version==1) {
        SingleItemTypeReferenceBoxLarge references[ ];
    }
}
```

According to an embodiment, a new item reference type called 'vai' can be defined. In this reference type, from_item_ID may represent the item which contains the AI payload and to_item_ID may reference the AI item IDs which may use it as input for generating their AI results.

According to an embodiment, the referencing can be a "dependent" relationship where from_item_ID represents an AI item which requires inputs from the items listed with to_item_ID.

Item 7:

Item 7 relates to a generic mechanism to store or point to the utilized neural network model. This can be implemented by a new property which may be called NNProperty and by storing the applied neural information in this property box. The syntax of this property may be as follows:

```
aligned(8) class NNProperty
    extends ItemFullProperty('nnpr', version = 0, flags = 0)
{
    string nn_description;
    string nn_representation;
    string nn_URL;
    NNModelBox( );
}
``` nn_description is a textual description of the neural network mode (e.g. "Yolo Detector")

nn_representation is a textual or enumerated and well formatted string field which contains the neural network's (NN) representation detail. Possible values could be, but not limited to, ["raw", "onnx", "h5", "meta", "zip", etc.]. This field provides information about the representation format of the neural network. By checking this field, NN user can know which decompressor or format reader it has to use on the stored or pointed neural network model.

nn_URL is a URI or URL which may provide a pointer to the neural network model. When nn_URL is NULL, NNModelBox is expected to be must be present and contain the neural network.

The neural network data model may be stored in the NNModelBox box as follows:

```
aligned(8) class NNModelBox
    extends FullBox('nnmb', version = 0, flags = 0) {
    unsigned int(8)nn_model_data[ ];
}
``` nn_model_data is an opaque data array which contains the representation of the neural network.

According to another embodiment, NN model data can be another item in HEIF. In such scenario, the neural network model data can be stored in the media box or 'idat' box inside the meta 'box', based on the preference of the content creator. In such a scenario, the NN model item may be linked to an image item with an item reference of type 'nnrf'. This 4-character code is an example and different such codes may be used.

According to another embodiment, the NNProperty without or with the NNModelBox may be attached to a neural network model item.

Storage of AI Metadata in a Timed Metadata Track:

If AI metadata belongs to samples of an image sequence or samples of a video track, AI metadata can be stored as samples of a timed metadata track. The samples can be stored as opaque data or data blobs. The sample descriptions for the metadata samples may be defined as follows:

```
class AIMetaDataSampleEntry( ) extends
MetaDataSampleEntry('aise') {
    AIInfoBox( ); //may be present optionally
    Box[ ] other_boxes; // optional
}
```

AIInfoBox may have the same structure as the VAIIProperty box which was defined previously.

Each AI metadata sample may contain different AI algorithm or service result, where each service can be defined in a separate AIMetadataSampleEntry and assigned to samples via sample_description_index field in the SampleToChunkBox.

According to an embodiment, the utilized neural network models and related information can be stored in the meta box and get related to the media track via EntitytoGroup box.

Metadata for a Pre-Derived Coded Image that Resulted as an Output of an AI Based Algorithm:

The embodiment described in the following is applicable when the output of an AI based algorithm resulted into a modified image that was then coded and stored in a HEIF file.

Pre-derivation image property indicates the types of derivation operations that were applied on the referenced image items to generate a pre-derived coded image. This descriptive item property is applicable to pre-derived coded images. The pre-derivation image property indicates that all the 'base' referenced image items of the associated pre-derived coded image were utilized in all the derivation operations listed in the pre-derivation property to generate the pre-derived coded image.

According to an embodiment, the syntax of the pre-derivation item property is appended as follows to include metadata related to the algorithm(s) that were used in the pre-derivation.

```
aligned(8) class PreDerivationProperty
    extends ItemFullProperty('prdp', version = 0, flags = 0) {
    unsigned int(8) entry_count;
    for(i = 0; i < entry_count; i++) {
        unsigned int(32) pre_derivation_4cc;
    }
    string service; // optional
    string service_version;// optional
    string service_description;// optional
    string schema_location;// optional
    VAIDataBox( );
}
```

The semantics of service, service_version, service_description, schema_location, and VAIDataBox( ) may be specified as above or may be generalized to apply to any pre-derivation operation rather than just AI based algorithms.

A new value of pre_derivation_4 cc, such as 'vai', may be defined to indicate pre-derivation based on AI algorithms. Alternatively, a new value of pre-derivation_4 cc, such as 'srvc', may be defined to indicate pre-derivation based on an indicated service.

It may be required that service, service_version, service_description, schema_location, and VAIDataBox( ) are present when pre_derivation_4 cc is equal to the new type (e.g. 'vai' or 'srvc'). In another approach, the syntax is changed so that service, service_version, service_description, schema_location, and VAIDataBox( ) are conditionally present only when pre_derivation_4 cc is equal to the new type.

entry_count may be required to be equal to 1 when any data follows the loop of pre_derivation_4 cc values. Consequently, it is unambiguous which pre-derivation operation the service-related syntax elements describe.

Figure 5:
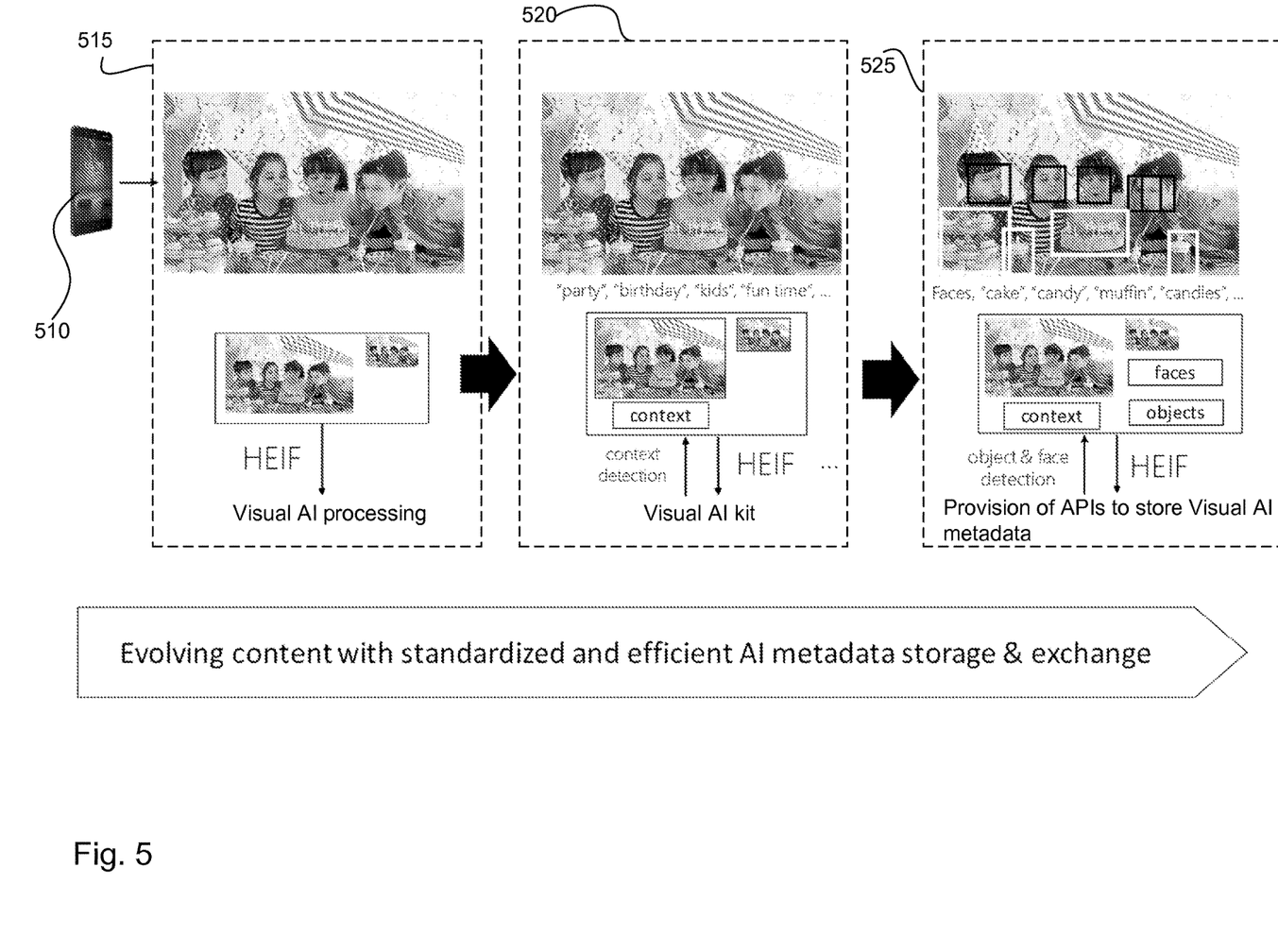
FIG. 5 shows an example of HEIF as a Media Format for intelligent content.

FIG. 5 illustrates an example of HEIF as a Media Format for intelligent content. A visual content, in this example an image, is captured by a capturing device 510, for example a smart phone. The image is stored in a HEIF container and provided for visual AI processing 515 either to a cloud service or to an AI processing unit of the capturing device. At first a context of the visual content is detected in the AI processing 520. In this example, the context can be defined with keywords "party", "birthday", "kids", "fun time", . . . . The context data is stored as a metadata to the HEIF container. After context detection, the image is processed 525 to detect objects (e.g. "cake", "candy", "muffin", "candles", . . . ) and faces. The data for faces and objects are also stored as metadata to the HEIF container.

Figure 6:
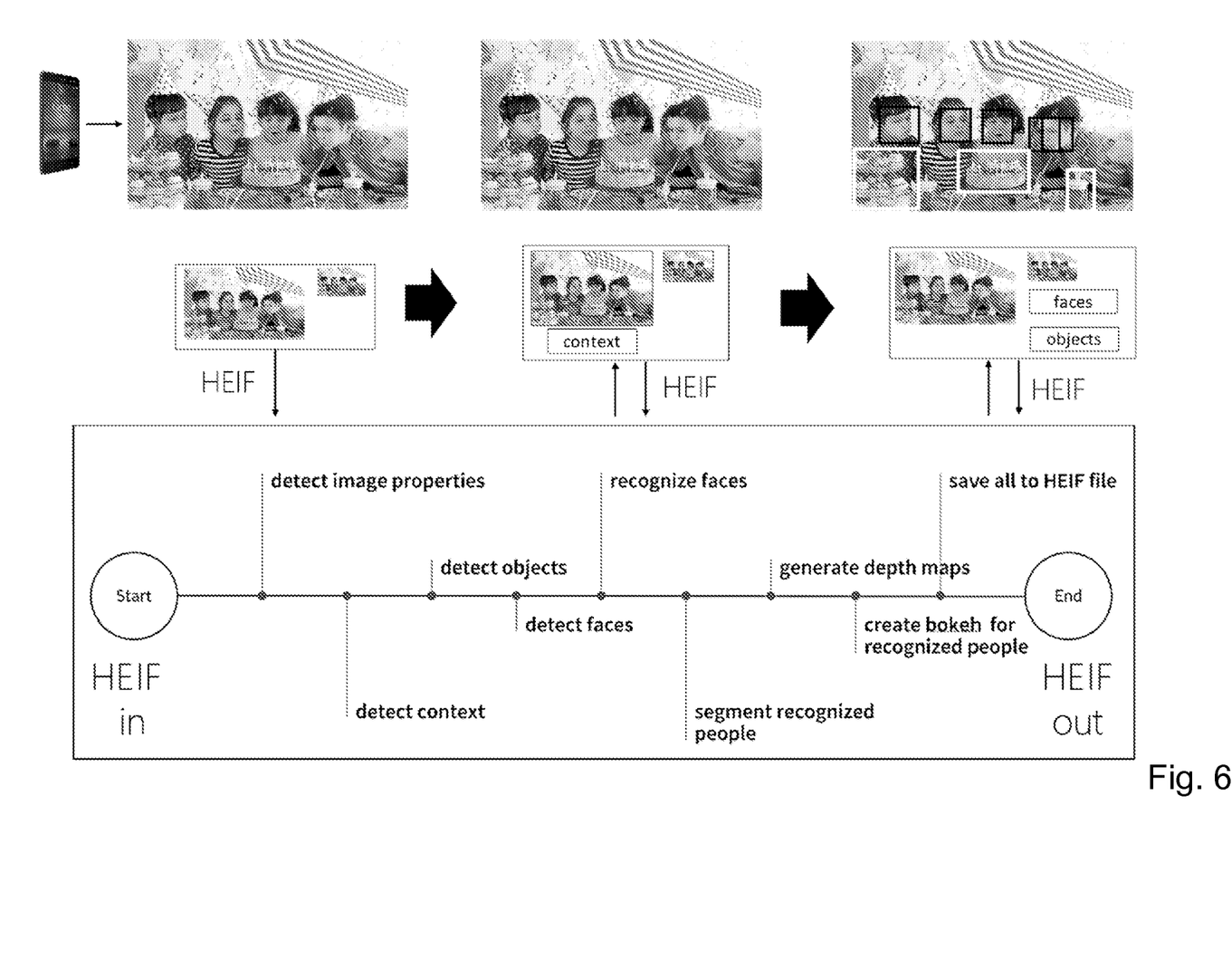
FIG. 6 shows an example of a process for a visual content recognition.

The process of the AI algorithm, according to an embodiment, is discussed in more detailed manner with reference to FIG. 6. As shown in FIG. 6, the process starts by receiving an image data e.g. in HEIF. At first image properties are detected, after which context, objects and faces are detected. Then, if possible, the faces are recognized, i.e. identified. Such people that have been recognized, are segmented. Depth maps may be generated, based on which a Bokeh effect can be created for recognized people. The result of the AI algorithm, i.e. all the detected/generated data is saved as metadata to the HEIF file, which is then output. The HEIF container being output now comprises not only the image file, but also the metadata defining the identified content of the image that has resulted from the AI processing algorithm.

Figure 7:
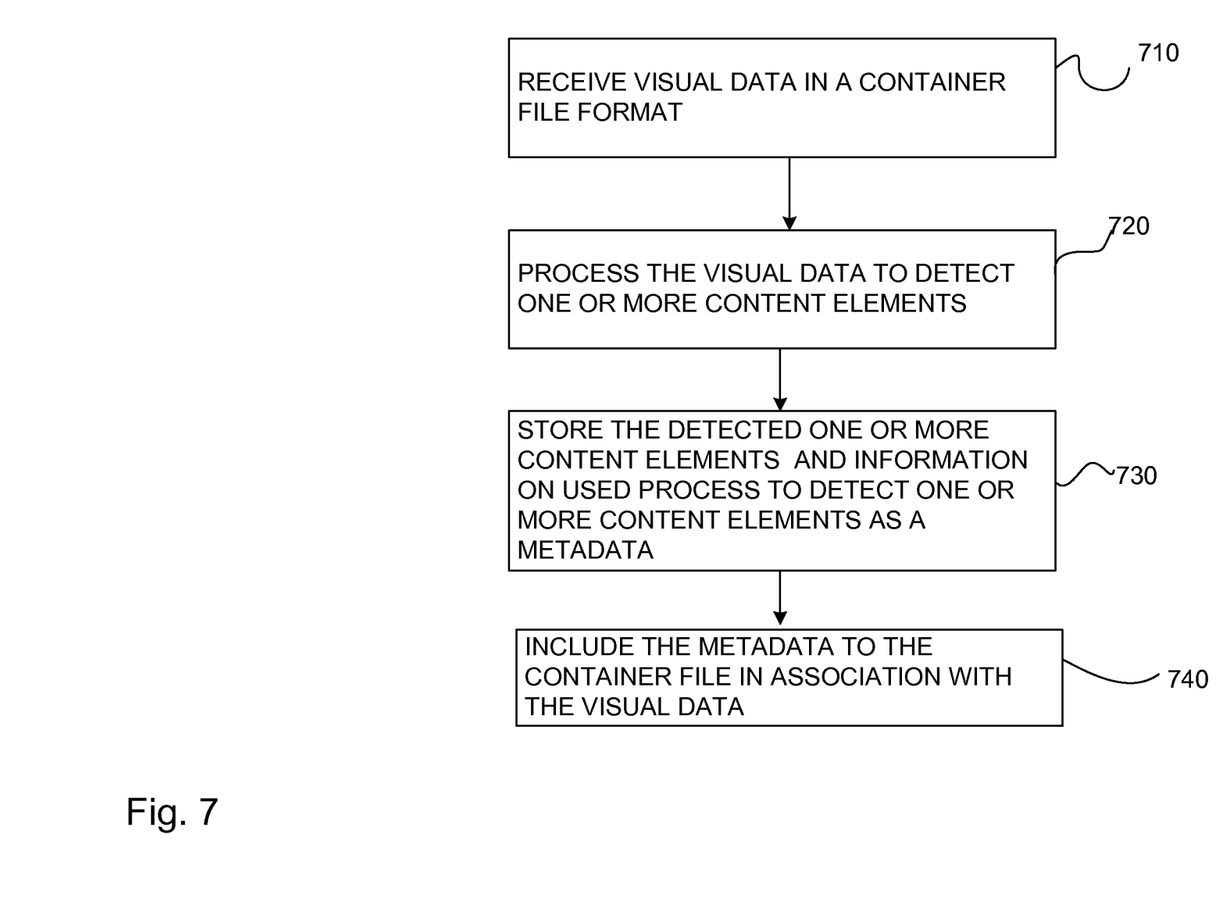
FIG. 7 is a flowchart illustrating a method according to an embodiment.

FIG. 7 is a flowchart illustrating a method according to an embodiment. A method comprises receiving 710 visual data in a container file format; processing 720 the visual data to detect one or more content elements; storing 730 the detected one or more content elements and information on used process for detecting said one or more content elements as a metadata; and including 740 the metadata to the container file in association with the visual data. According to an embodiment, the visual data may be processed by one or more neural networks. Alternatively, non-neural network based algorithms may be used instead to detect the one or more content elements.

An apparatus according to an embodiment comprises means for receiving visual data in a container file format; means for processing the visual data to detect one or more content elements; means for storing the detected one or more content elements and information on used process for detecting said one or more content elements as a metadata; and means for including the metadata to the container file in association with the visual data. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises receiving visual data in a container file format; processing the visual data to detect one or more content elements; storing the detected one or more content elements and information on used process for detecting said one or more content elements as a metadata; and including the metadata to the container file in association with the visual data.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   receiving a visual data in a container file, wherein the container file is compatible with a container file format;
   processing the visual data by using a plurality of processes to detect one or more content elements;
   storing, the detected one or more content elements and information on the plurality of processes used to detect said one or more content elements, as a metadata;
   indicating dependencies between the plurality of processes by using a first indication and a second indication, wherein the first indication represents an item which requires one or more inputs, and wherein the second indication represents items comprising said one or more inputs; and
   including the metadata in the container file associated with the visual data.

2. The method according to claim 1, wherein the container file comprises a first box comprising a metadata on a processing algorithm.

3. The method according to claim 1, wherein the container file comprises a second box comprising a metadata on said one or more content elements.

4. The method according to claim 1, wherein the container file comprises a third box comprising a metadata on a process of multiple processing algorithms.

5. The method according to claim 1, wherein the container file comprises an image sequence or a video, and wherein the container file comprises a media sample definition for media tracks containing the metadata.

6. The method according to claim 1, wherein the container file comprises relationship definitions for defining an association between a container and other entities comprising information in the container file.

7. The method according to claim 1, wherein the visual data is processed by one or more neural networks; or one or more non-neural network based algorithms to detect said one or more content elements.

8. An apparatus comprising at least one processor; and at least one memory including computer program code; the at least one memory and the computer program code configured to, with the at least one processor, cause the apparatus at least to perform:
   receive visual data in a container file, wherein the container file is compatible with a container file format;
   process the visual data by means of a plurality of processes to detect one or more content elements;

store the detected one or more content elements and information on used processes to detect said one or more content elements as a metadata;

indicate dependencies between various processes, a first and second indication, where the first indication represents an item which requires one or more inputs, and where the second indication represents items comprising said one or more inputs; and include the metadata to the container file in association with the visual data.

9. The apparatus according to claim 8, wherein the container file comprises a first box comprising metadata on a processing algorithm.

10. The apparatus according to claim 8, wherein the container file comprises a second box comprising metadata on said one or more content elements.

11. The apparatus according to claim 8, wherein the container file comprises a third box comprising metadata on a process of multiple processing algorithms.

12. The apparatus according to claim 8, wherein the container file is an image sequence or a video, and wherein the container file comprises a media sample definition for media tracks containing the metadata.

13. The apparatus according to claim 8, wherein the container file comprises relationship definitions for defining an association between a container and other entities comprising information in the container file.

14. The apparatus according to claim 8, further comprising one or more neural networks;

or one or more non-neural network based algorithms for processing the visual data to detect said one or more content elements.

15. An apparatus according to claim 8, further comprising at least one processor and memory including computer program code.

16. A Computer program product comprises at least one non-transitory computer-readable storage medium having computer executable program code instructions stored therein, the computer executable program code instructions comprising program code instructions configured, upon execution, to:

receive a visual data in a container file, wherein the container file is compatible with a container file format;

process the visual data by using a plurality of processes to detect one or more content elements;

store, the detected one or more content elements and information on the plurality of processes used to detect said one or more content elements, as a metadata;

indicate dependencies between the plurality of processes by using a first indication and a second indication, wherein the first indication represents an item which requires one or more inputs, and wherein the second indication represents items comprising said one or more inputs; and include the metadata in the container file associated with the visual data.

17. The computer program product according to claim 16, wherein the container file comprises a first box comprising a metadata on a processing algorithm.

18. The computer program product according to claim 16, wherein the container file comprises a second box comprising a metadata on said one or more content elements.

19. The computer program product according to claim 16, wherein the container file comprises a third box comprising a metadata on a process of multiple processing algorithms.

20. The computer program product according to claim 16, wherein the container file comprises an image sequence or a video, and wherein the container file comprises a media sample definition for media tracks containing the metadata.

* * * * *